United States Patent [19]

Yeh

[11] Patent Number: 4,811,916
[45] Date of Patent: Mar. 14, 1989

[54] FISHING REEL WITH REMOVABLE ROTOR

[76] Inventor: Shih-Yuan Yeh, 2Fl., No. 2-4, Chen-Hsing Rd., Tai Ping Hsiang, Taichung Hsien, Taiwan

[21] Appl. No.: 194,959

[22] Filed: May 17, 1988

[51] Int. Cl.⁴ .............................................. A01K 89/01
[52] U.S. Cl. ........................................... 242/84.2 R
[58] Field of Search ............... 242/84.2 R, 84.2 A, 242/84.2 B, 84.2 C, 84.2 D, 84.2 E, 84.2 F, 84.2 G, 84.2 H, 84.2 J, 84.21 R, 84.21 A, 84.21 W

[56] References Cited

U.S. PATENT DOCUMENTS

| 2,974,895 | 3/1961 | Wood | 242/84.21 R |
| 3,520,488 | 7/1970 | Vouthier | 242/84.21 R |
| 3,635,418 | 1/1972 | Kamei | 242/84.21 R |
| 3,788,570 | 1/1974 | Yamazaki et al. | 242/84.21 R |
| 4,238,085 | 12/1980 | Jansson et al. | 242/84.2 G |
| 4,770,363 | 9/1988 | Tsunoda et al. | 242/84.2 R |

Primary Examiner—Joseph J. Hail, III
Attorney, Agent, or Firm—Morton J. Rosenberg

[57] ABSTRACT

A fishing reel including a casing, a spool, and a rotor rotatable by a handle. The rotor and the spool are combinable and detachable to the casing. The improvement includes: a stem extended from said rotor being provided with an annular groove; the casing being provided with a first slot for reception of a clamp member that has a U-shaped plate that fits in the annular groove after assembly, the clamp member includes a slit; and the casing being provided with a second slot for reception of a spring-loaded push knob which has a head portion insertable into the slit of the clamp member.

3 Claims, 3 Drawing Sheets

FISHING REEL WITH REMOVABLE ROTOR

BACKGROUND OF THE INVENTION

The present invention relates to fishing reels, and more particularly, to a fishing reel which is adapted to be used in connection with rotors and spools of various sizes.

Heretofore, smaller sport fishing and heavy fishing has required fishing reels of different scales. It is often very inconvenient for one to go fishing at a river or at the sea, because he may have to prepare two or more different sizes of fishing reels in order to receive fishing lines of different dimensions.

To enable a more convenient utilization of a fishing reel, it is preferable that the fishing reel is constructed in a manner where the interchanging of rotor and spool from the fishing reel's casing is possible.

SUMMARY OF THE INVENTION

It is a primary object of the present invention to provide a fishing reel having a casing which is engageable with rotors and spools of various sizes or scales.

Another object of the present invention is to provide a fishing reels which is adapted to be used in connection with different sizes of rotors and spools in a comparatively simple manner.

Further objects and advantages of the present invention will become apparent to those skilled in the art upon reading the detailed description provided hereinbelow, with reference to the accompanying drawings.

DETAILED DESCRIPTION OF THE PREFERRED EMBODIMENT

Figure 1:
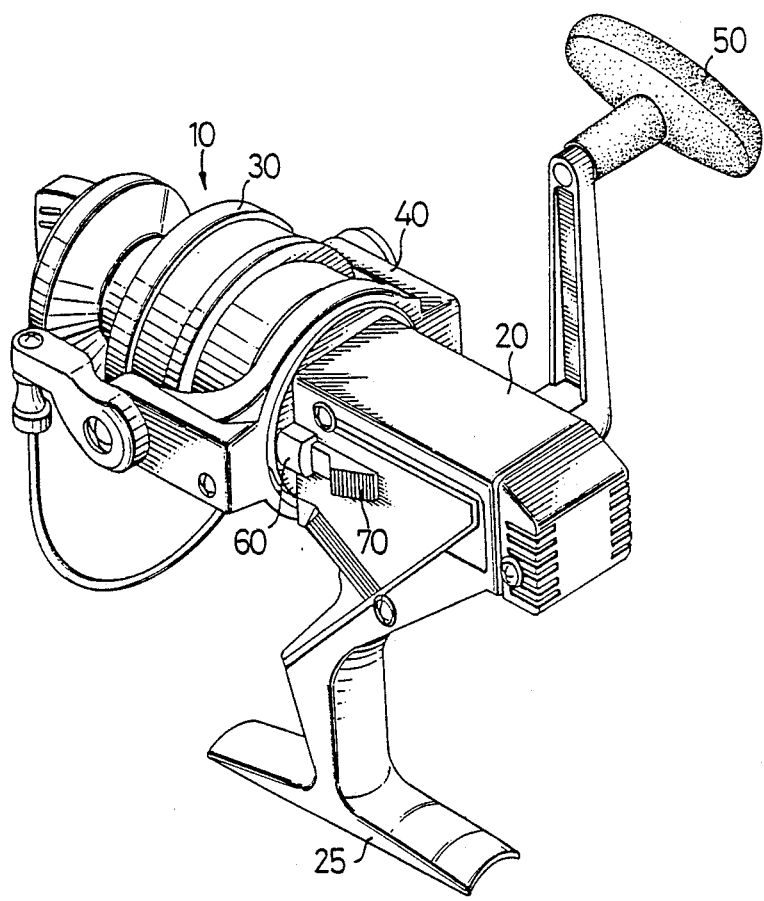
FIG. 1 is a perspective view of a fishing reel in accordance with the present invention.

Referring to the drawings and initially to FIG. 1, it can be seen that a fishing reel in accordance with the present invention is designated by reference numeral 10. As is common in the structure of a conventional fishing reel, the fishing reel 10 of the present invention includes a casing 20 serving as a frame for an axially movable spool 30 and a rotor 40 rotatable by means of a handle or a crank 50 mounted on a lateral side of the casing 20.

Figure 2:
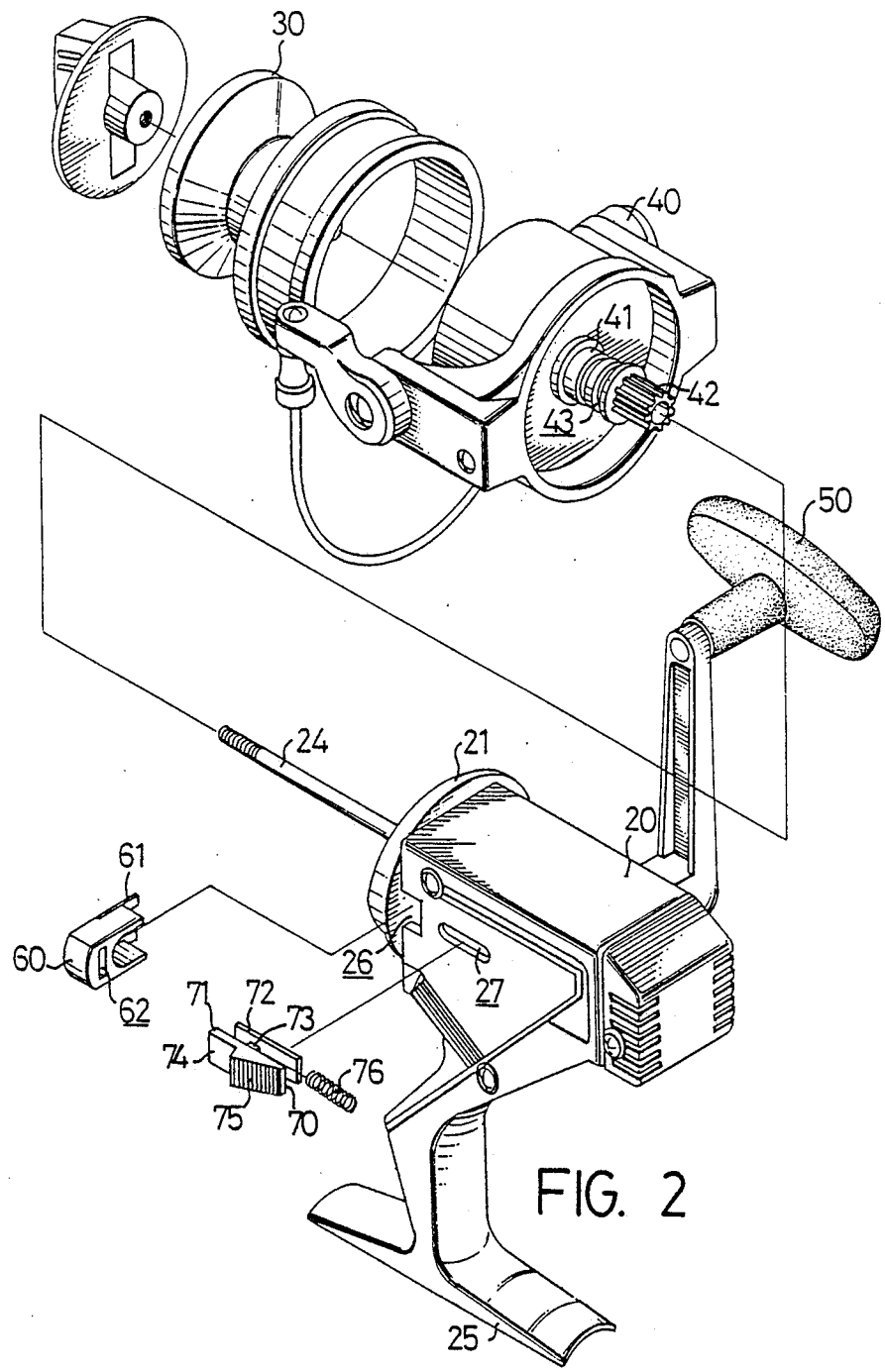
FIG. 2 is an exploded view of the fishing reel shown in FIG. 1.

Referring next to FIG. 2, as is common in the structure of a conventional fishing reel, the casing 20 is provided with a coupling disk 21 adapted to combine with the rotor 40. The coupling disk 21 has a central annular protrusion 22 defining an opening 23 for receiving the rotor 40. Projecting from the casing 20 is a shaft 24 having a threaded end portion for receiving the rotor 40 and the spool 30 in series. The casing 20 is provided with a seat 25 so as to be firmly set on a conventional fishing rod (not shown).

Referring again to FIG. 2, it can be seen that a stem 41 and a gear wheel 42 are formed on and protrude from the rotor 40. The stem 41 is provided with an annular groove 43 at a position substantially between the stem 41 and the gear wheel 42.

A first slot 26, preferably a rectangular slot, is formed on one side of the casing 20, at a position corresponding to the stem 41 after assembly of the rotor 40 and the casing 20, for reception of a clamp member 60. The clamp member 60 is substantially in a horseshoe configuration or a U-shaped configuration. The clamp member 60 includes a thin U-shaped plate 61 protruding from the clamp member 60 at a side and a slit 62 formed on an opposite side thereof. The U-shaped plate 61 is unidirectionally formed with the U-shaped clamp member 60 and is insertable into the annular groove 43 formed on the stem 41. The thickness of the U-shaped plate 61 is therefore substantially equal to or slightly smaller than the width of the annular groove 43.

The casing 20 is further provided with a second slot 27, preferably an elliptical slot, on the same side of the first slot 26, for reception of a spring-loaded push knob 70. The push knob 70 includes a first plate 71, a second plate 72 having a size substantially larger than the size of the second slot 27, and a neck portion 73 joining said first plate 71 to said second plate 72. It is preferable that the neck portion 73 has a height substantially equal to the thickness of the casing 20. The first plate 71 includes a head portion 74, and a knob portion 75. The head portion 74 is insertable into the slit 62 formed on the clamp member 60. The size and shape of the head portion 74 is therefore substantially equal to the size and shape of the slit 62. The knob portion 75 is disposed on an outer surface of the casing 20 after assembly such that the push knob 70 is manually operable so as to move along the second slot 27 either forwardly or rearwardly. A spring member 76 is provided at a position behind the neck portion 73.

Figure 3:
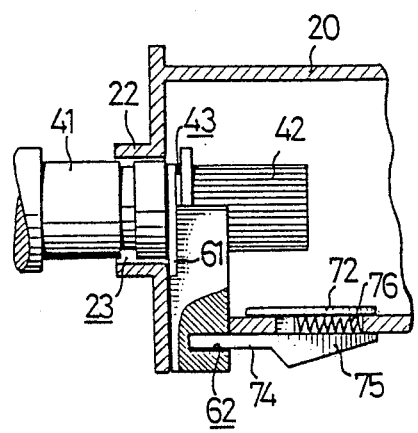
FIG. 3 is a sectional fragmentary view of the fishing reel of FIG. 1, illustrating the engagement of the rotor with the casing.

The manner in which the rotor 40 and the casing 20 is assembled is depicted most clearly in FIGS. 2 and 3. The engagement of the spool 30 and the rotor 40 is accomplished in conventional manner which requires no further description.

As previously mentioned, the push knob 70 is connected to the casing 20 with the knob portion 75 exposed to the outside so that the push knob 70 can be urged manually to move either forwards or rearwards along the second slot 27. The head portion 74 of the push knob 70 faces toward the position of the slit 62 of the clamp member 60. The push knob 70 is normally urged toward the slit 62 because of the spring force exerted by the spring member 76.

The rotor 40 having hollow stem 41 and gear wheel 42 encompasses the shaft 24 which is extended from the casing 20 and partially passes through the opening 23 defined by the annular protrusion 22. The stem 41 is urged rearwardly such that the annular groove 43 is retained inside the casing 20.

The clamp member 60 is fitted in the casing 20 through the first slot 26 such that the U-shaped plate 61 fits snugly into the annular groove 43, thereby fixing the stem 41 as well as the rotor 40 and preventing them from moving axially. It is important to note that when fitting the clamp member 60, one should first push the push knob 70 backwards. After the clamp member 60 is inserted, then the push knob 70 is released so that the head portion 74 fits into the slit 62 of the clamp member 60.

To take off the rotor 40 simply reverse the sequence. Accordingly, the rotor 40 together with the spool 30 can be assembled and disassembled from the casing 20 in a comparatively simple manner.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. In a fishing reel comprising a casing serving as a frame for an axially movable spool and a rotor having a gear wheel rotatable by means of a handle, said casing being provided with a coupling disk adapted to combine with said rotor, and a shaft projecting from said casing for receiving said rotor and said spool, said rotor and said spool being combinable and detachable to said casing, the improvement comprising:

a stem extended from said rotor being provided with an annular groove substantially between said stem and a gear wheel;

a first slot formed on one side of said casing at a position corresponding to said stem after assembly of said rotor and said casing for reception of a clamp member, said clamp member being substantially a horseshoe body, said clamp member having a U-shaped plate protruding from one side thereof and a slit formed on an opposite side thereof, said U-shaped plate being fittable on said groove; and a second slot on said casing for reception of a spring-loaded push knob, said push knob including a first plate, a second plate having a size substantially larger than the size of said second slot, and a neck portion connecting said first plate with said second plate, said first plate having a head portion insertable into said slit of said clamp member, and a knob portion disposed on an outer surface of said casing for urging said push knob to move along said second slot either forwardly or rearwardly.

2. A fishing reel as claimed in claim 1, wherein said first slot is a rectangular slot.

3. A fishing reel as claimed in claim 1, wherein said second slot is an elliptical slot.

* * * * *